United States Patent [19]

Beeghly

[11] 4,413,608
[45] Nov. 8, 1983

[54] ELECTRONIC IGNITION WITH ADVANCE

[75] Inventor: Bruce R. Beeghly, Youngstown, Ohio

[73] Assignee: The Economy Engine Company, Youngstown, Ohio

[21] Appl. No.: 325,317

[22] Filed: Nov. 27, 1981

[51] Int. Cl.³ ............................. F02P 3/06; F02P 500
[52] U.S. Cl. .................................... 123/599; 123/418; 123/602
[58] Field of Search ............... 123/418, 407, 602, 601, 123/605, 519, 643; 307/252 J, 252 K

[56] References Cited

U.S. PATENT DOCUMENTS

| | | | |
|---|---|---|---|
| 3,357,008 | 12/1967 | Walsh | 307/252 K |
| 3,408,513 | 10/1968 | Cooper et al. | 307/252 J |
| 3,435,256 | 3/1969 | Young | 307/252 K |
| 3,821,565 | 6/1974 | Horinaga | 307/252 J |
| 3,911,886 | 10/1975 | Nagasawa | 123/599 |
| 3,963,945 | 6/1976 | Colyn | 307/252 K |
| 4,010,726 | 3/1977 | Kondo et al. | 123/599 |
| 4,170,207 | 10/1979 | Boyama | 123/602 |
| 4,346,690 | 8/1982 | Anderson | 123/599 |

Primary Examiner—Raymond A. Nelli
Attorney, Agent, or Firm—Webb, Burden, Robinson & Webb

[57] ABSTRACT

A trigger circuit comprises first, second and third triggerable switches each being rendered conductive when a signal at its control terminal reaches the threshold level. The first switch is connected to accept a timing pulse signal. The first and second switches are connected in series with each other and a control terminal of the third switch to activate the third switch when both the first and second switches have become conductive.

A delay circuit is in series with the first switch and in parallel with the gate and one other terminal of the second switch. A time delay is introduced after the first switch is activated by the timing pulse signal and before the second switch is activated to thus trigger the third switch.

14 Claims, 6 Drawing Figures

| RPM | DEG.BTDC |
|-----|----------|
| 600 | 0° |
| 620 | 2.5° |
| 651 | 5° |
| 682 | 7.5° |
| 713 | 9.5° |
| 744 | 11.5° |
| 775 | 13° |
| 806 | 14° |
| 837 | 15° |
| 868 | 16° |

ELECTRONIC IGNITION WITH ADVANCE

DESCRIPTION

1. Technical Field

Electronic ignition systems for internal combustion engines are desirable, among other reasons, because they eliminate mechanical switches and distributors. A drawback of prior electronic ignition systems is that they are not adjustable to the degree desired. The prior ignition systems were not easily programmed to provide, say, a desired fixed timing advance over specified operating speed range of the engine or to vary the advance in timing with speed over the operating range.

It is an advantage according to this invention to provide an electronic ignition circuit for an internal combustion engine that can be adjusted to provide relatively fixed timing over the entire operating speed range of the engine.

It is yet another advantage according to this invention to provide an ignition system that provides a programmable increase in timing advance with increase in speed over the operating speed range of the engine.

2. Background Art

Numerous electronic ignition systems designed to provide desired timing versus speed characteristics have been patented. See, for example, U.S. Pat. Nos. 3,240,198; 3,573,545; 3,587,550; 3,815,560; 3,898,972; 3,952,715; 4,132,208; 4,150,652; 4,166,439; 4,170,207; 4,170,208; 4,188,929; and 4,228,780.

DISCLOSURE OF THE INVENTION

Briefly according to one embodiment of this invention there is provided a triggering circuit in the ignition system of an internal combustion engine. The triggering circuit comprises three triggerable switches, for example SCRs, each of which are rendered conductive when a signal at its control input reaches a threshold level. A first switch is gated on by a timing signal generated in synchronism with the rotation of the engine crankshaft. A third switch is connected in a circuit that generates an ignition spark when the thrid switch is rendered conductive. For example, the third switch may be arranged to discharge a storage capacitor in a capactive discharge ignition system. The first switch and second switch are connected in series with each other and the control terminal or gate of the third switch. Thus when both the first and second switches are gated to conduct, the third switch will be gated to conduct also. The second switch is part of a delay circuit. The delay circuit comprises a delay capacitor in parallel with the gate and one other terminal of the second switch. The delay circuit also includes a voltage source and charging resistance in series with the capacitor and the anode/cathode terminals of the first switch. When the delay capacitor charges to a voltage level that carries the voltage at the gate of the second switch to the threshold trigger level thereof, both the first and second switches conduct to gate the third switch. The charging resistance and the capacitance of the delay capacitor affect the time it takes for the threshold trigger level to be obtained after the first switch is triggered on by the timing signal. (If the delay capacitor always charges from the same minimum voltage, the time delay would be fixed resulting in a relative retard of the timing angle with an increase in engine speed.) However, a discharge resistor is placed in parallel with the delay capacitor. The rate at which the delay capacitor discharges depends upon the magnitude of the discharge resistor. The minimum voltage down to which the delay capacitor discharges depends upon the discharge rate and the time between timing pulse signals. As the speed of the engine increases, the time between timing pulse signals shortens. Thus the minimum voltage level to which the delay capacitor may discharge increases. Since the threshold of the second switch remains constant, the time it takes for the capacitor to be charged again to a voltage carrying the gate of the second switch to its threshold diminishes. It has been found that the RC time constants of the separate charging and discharging circuits of the delay capacitor can be selected to provide a relatively fixed timing retard (which may be converted to an advance by displacement of the timing pulse signals) over the operating range of an internal combustion engine. In other words, the time for charging the capacitors is proportional to the time between timing signals over the operating load range of the engine. Said in yet another way, the angle of advance remains relatively constant over the operating range of the engine.

The resistances of the charging and discharging circuits can be made adjustable, as with potentiometers or rheostats to tune the timing to the requirements of the particular engine or fuel encountered.

The novel delay circuit, heretofore described, may be augmented to provide a programmable timing advance with increased speed. The source voltage for the charging circuit of the delay capacitor may be adjusted with speed of the engine. By increasing the source voltage to the capacitor timing circuit with increasing speed, the time for charging the delay capacitor will diminsh. Preferably, according to this embodiment, a hardware clock provides a time base and a programmable interval timer establishes an ignition pulse counting interval. The number of pulses counted during an ignition pulse counting interval will be directly proportional to speed. Preferably, the counting interval is synchronized to always commence with an ignition pulse, i.e., a signal directly related to sparking. The count (related RPM) is latched by output latches at the end of the counting interval and then passed to a digital-to-analog converter where it is converted to a source voltage for the charging circuit of the delay capacitor. The digital-to-analog conversion may, for example, comprise a plurality of series connected zener diodes with intermediate points connected to ground through electronic analog switches, say FET switches, which can be selected by the digital output of the output latches. Since advance may only be desired during the operating range of an ignition system, the pulse counting circuit may be provided with means to disregard a count indicative of the lower end of the operating speed range.

It is preferable according to this invention that a diode be placed in the discharge circuit of the delay capacitor in series with the gate of the second switch. It is further preferred that the RC time constant of the capacitor and discharge resistor be between about 1 to 0.1 times the period between pulses at the lower end of the operating speed range.

BRIEF DESCRIPTION OF THE DRAWINGS

Further features and other objects and advantages of this invention will become clear from the following detailed description made with reference with the drawings, in which.

BEST MODE FOR CARRYING OUT THE INVENTION

Figure 1:
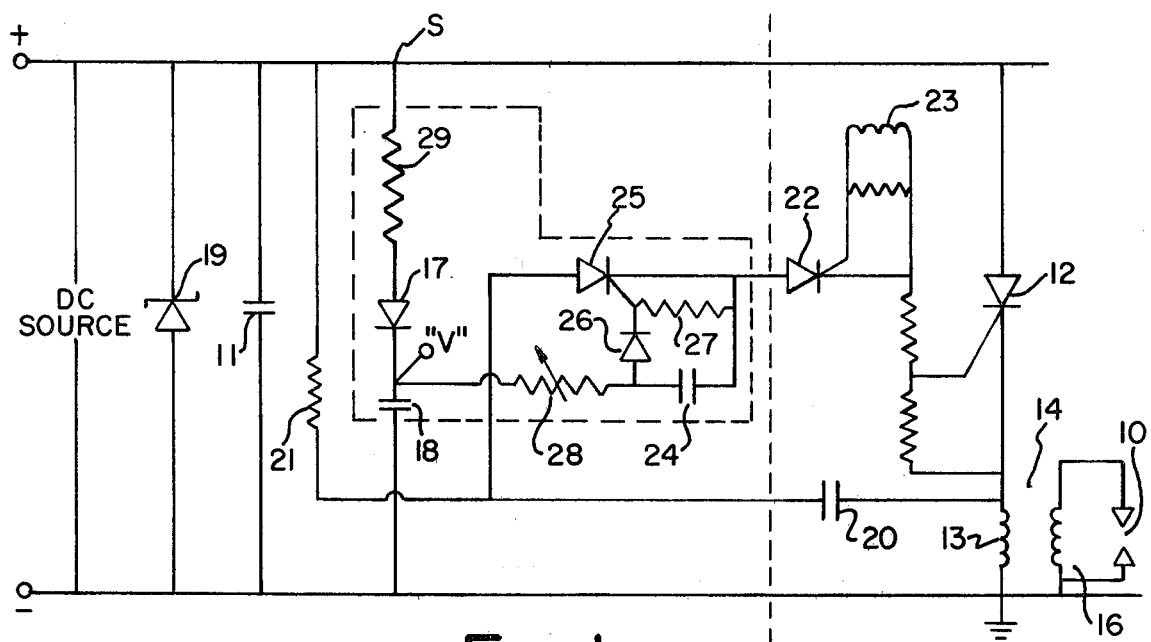
FIG. 1 is a schematic circuit diagram of an ignition system according to this invention.

Referring now to FIG. 1, the positive discharge circuit is illustrated. To generate a spark at spark gap 10, storage capacitor 11 is discharged through power switch 12 to the primary winding 13 of coil 14. The power switch may, for example, comprise an SCR, thyristor or other triggerable switch. A high voltage is thus induced in a secondary winding 15 of the coil 14 which is in series with the spark gap 10.

The storage capacitor 11 is charged by a DC power source (not shown). The voltage across the storage capacitor is limited by zener diode 19.

A trigger capacitor 20 is charged through resistor 21 and primary winding 13. The trigger capacitor 20 is discharged by circuitry to be described applied to the gate of the power SCR 12, the gate of the power SCR into conduction.

For multiple cylinder internal combustion engines, each cylinder has its own spark gap, coil, power SCR, and trigger capacitor. The elements shown to the right of the dashed line in FIG. 1 are repeated as many times as there exists cylinders to be serviced. Of course, a twelve cylinder engine might be serviced by two systems as shown in FIG. 1 with each system repeating the portions to the right of the dashed line six times.

Each cylinder may have associated with it a trigger switch 22 for gating the trigger capacitor 20 to the gate of the power switch 12. The trigger switch (for example an SCR) has a gate that is arranged to receive the output of a device which generates timing pulse signals (trigger pulses) in synchronism with the engine. One example of such a device would be a pick-up coil 23 arranged across the gate cathode circuit of the trigger SCR with the pick-up coil positioned near a rotating disk (not shown) carrying a magnet thereon. The magnet, as it rotates by the pick-up coil, induces a voltage therein. The disk is rotated in synchronism with the crankshaft of the internal combustion engine being served so that the magnet induces a voltage in the coil 23 a fixed number of degrees of rotation before the cylinder with which it is associated reaches top dead center on the compression stroke.

Any number of timing pulse signal devices are known including those that replaced the coil 23 with a reed switch and a power source, a Hall effect switch and a power source, a photodiode and a power source in which case a light baffle replaces the magnet. The invention described herein may be used no matter how the timing pulse signal is generated. It does not depend upon the rate at which the pulse signals rise. A sharp rise in pulse signal is desirable. The pulse must, of course, be of the correct polarity and voltage to activate the switch 22 usually an SCR into its conductive state.

While the trigger SCR 22 gates on in response to the timing pulse signal from its respective pick-up coil 23, the respective trigger capacitor does not immediately discharge. A delay circuit is imposed between the switch 22 and the capacitor 20 comprising a delay capacitor 24 that must first be charged to a threshold voltage of a delay SCR 25. The gating of the trigger SCR initiates a delay period after which both trigger SCR and the delay SCR 25 discharge trigger capacitors corresponding to the trigger SCR.

Connected between the gate and cathode of the delay SCR 25 is a delay capacitor 24 and a bleed or discharge resistor 27. Capacitor 18, charged through resistor 29, serves as the tank supply for charging the delay capacitor 24. A variable resistor 28 is also in the charging circuit of delay capacitor 24. The diode 26 in the delay capacitor discharge circuit protects the gate of the delay SCR from negative voltages. It has a threshold resistance of about 0.7 volts and thus prevents the delay capacitor from discharging below about 0.7 volts. If more than one diode is used, the threshold resistance of the diodes is increased, of course. Moreover, the capacitor must be charged to more than about 0.7 volts greater than the threshold voltage of the delay SCR (for example 0.55 volts) to gate the SCR into conduction. When the trigger SCR 22 is gated into conduction, the delay capacitor 24 charges. The voltage on the cathode of diode 26 thus moves toward the threshold voltage of the delay SCR. The time during which the delay capacitor charges (pulling the voltage of the cathode of diode 26 toward the threshold voltage of the delay SCR) depends upon the RC time constant of the series resistor capacitor charging circuit (resistors 28 and 29 and capacitor 24), the source voltages at 'S' and 'V' and the starting voltage upon the capacitor.

Figures 2A, 2B:
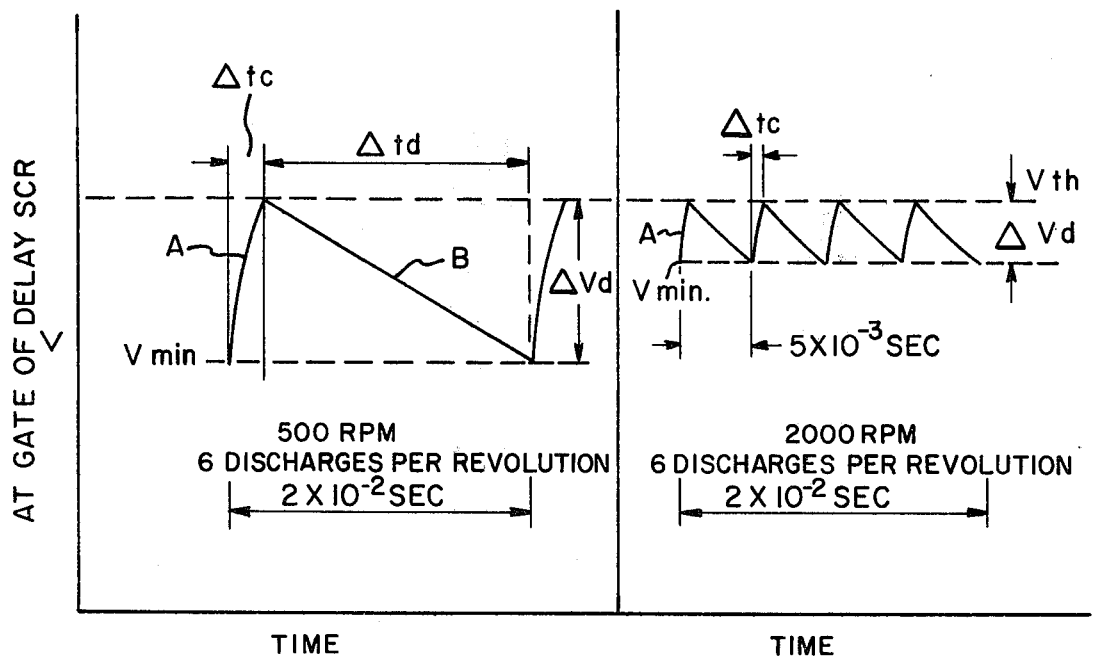
FIG. 2A and FIG. 2B are schematic graphs representing the voltage at the gate of the delay switch versus the time between ignition pulses.

Referring to FIG. 2A, the charging curve A for the delay capacitor is an exponential curve. According to this invention, the gate voltage is maintained between zero and the threshold voltage $V_{th}$ of the SCR. The delay time $\Delta t_c$ is the time for the capacitor to charge from the minimum gate voltage $V_{min}$ to the threshold voltage $V_{th}$. The delay capacitor starts to discharge through the gate of the delay SCR as soon as it is triggered on and discharges through the bleed resistor 27 at all times. After the delay SCR shuts off (following discharge of the trigger capacitor) and until the next trigger SCR gates on, the delay capacitor continues to discharge through the discharge resistor. The length of the discharge period $\Delta t_d$ is determined by the speed of the engine and the number of spark pulses per revolution of the crankshaft. The longer discharge time $\Delta t_d$ at lower speeds means that the minimum discharge voltage will be nearer to zero. This in turn means that the following delay periods $\Delta t_c$ will be longer.

Referring now to FIG. 2B, at higher speeds the time $\Delta t_d$ during which the delay capacitor discharges will be shortened and the minimum voltage to which the delay capacitor discharges will be increased. This results in a shorter time $\Delta t_c$ for charging the capacitor to carry the voltage at the gate of the trigger SCR to the threshold voltage thereof. Thus the delay period is automatically shortened with increase in speed. The amount of delay (at all speeds) can be adjusted by changing the conditions that effect the charging rate and the discharging rate of the delay capacitor. Increasing the charging resistance will increase the delay $\Delta t_c$. Decreasing the source voltage for the charging circuit will also increase the delay $\Delta t_c$.

In FIG. 1 the variable resistor 28 may be set to produce the desired delay for a given operating speed. Note that an advance is required for most internal combustion engines. This is achieved by having the trigger pulse occur uniformly before top dead center. The delay introduced by the delay circuit merely diminishes the advance resulting from the trigger pulse being fixed before top dead center. The circuit described with reference to FIG. 1 then has an adjustable advance or retard which automatically adjusts itself to maintain a more or less uniform angular advance over the operating speed range of the engine. There is a retard between the coming speed and the bottom of the operating range that cannot, practically speaking be avoided; nor is it in all instances undesirable. However, it may be desired to provide a system that has increasing angular advance versus increasing RPM over the speed range of the engine. One way this can be achieved is by increasing the source voltage applied to the charging circuit for the delay capacitor with increase in speed of the engine. The increased voltage might be the output of a d.c. tachometer. As speed increases voltage out of the tachometer will increase thus decreasing the delay period $\Delta t_c$. D.C. tachometers are electromechanical devices and to further reduce costs and increase reliability, a digital circuit for changing the source voltage at S is disclosed herein. While an electromechanical tachometer is designed to produce a linear increase in voltage with increase in speed, the speed versus voltage relationship to obtain the desired advance curve may not be linear. The digital circuit to be described can approximate nonlinear speed versus voltage curves by varying the magnitude of the step change of the output.

Figure 3:
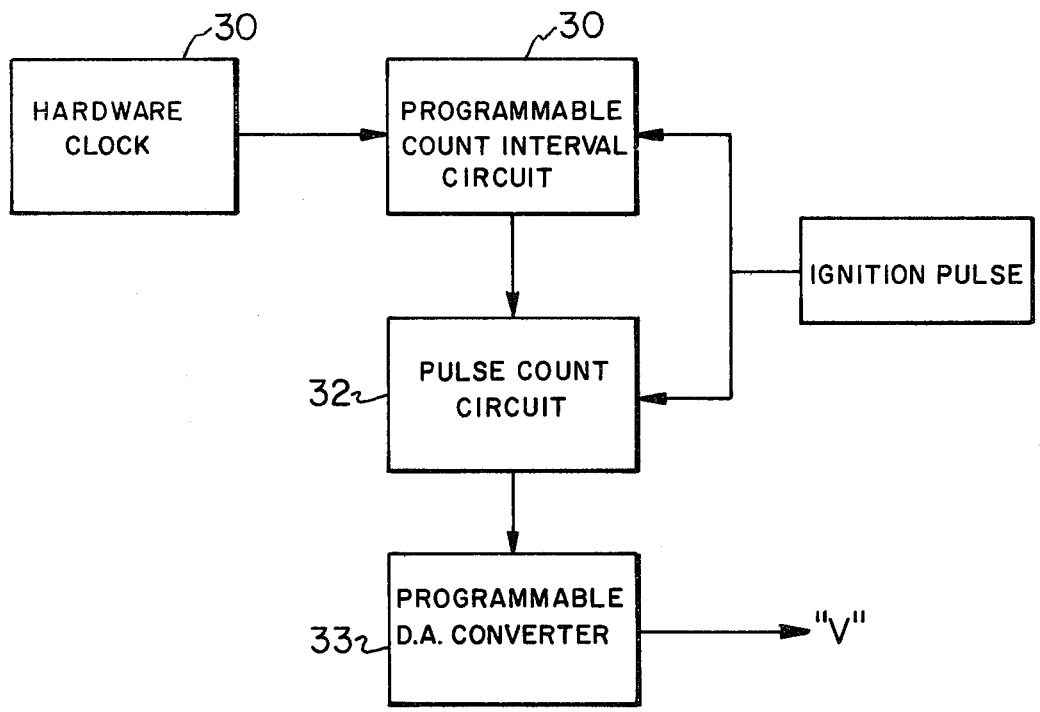
FIG. 3 is a block diagram of a circuit for varying the voltage applied to the delay circuit as a function of engine speed or crankshaft speed.

Referring now to FIG. 3 a block diagrm of a digital programmable tachometer for use with a preferred embodiment of this invention is shown. A hardware clock 30 provides a time base used by the remainder of the circuit. A programmable interval counter circuit 31 establishes a fixed time interval for counting ignition pulses. The time interval is synchronized to start with an ignition pulse. A pulse counter circuit 32 counts ignition pulses during the time interval to develop a count that is proportional to speed (RPM). The speed is related to the count by the following formula:

RPM/count=60/N×T (2 cycle engines)

RPM/count=120/N×T (4 cycle engines)

wherein N equals the number of cylinders and T the counting time (update period) in seconds. The count (related to RPM) is then passed to circuit 33 for converting to a voltage for application to the delay capacitor charging circuit. For example, with reference to FIG. 1, the output of the digital-to-analog converter would be applied at point 'V'.

Figure 4:
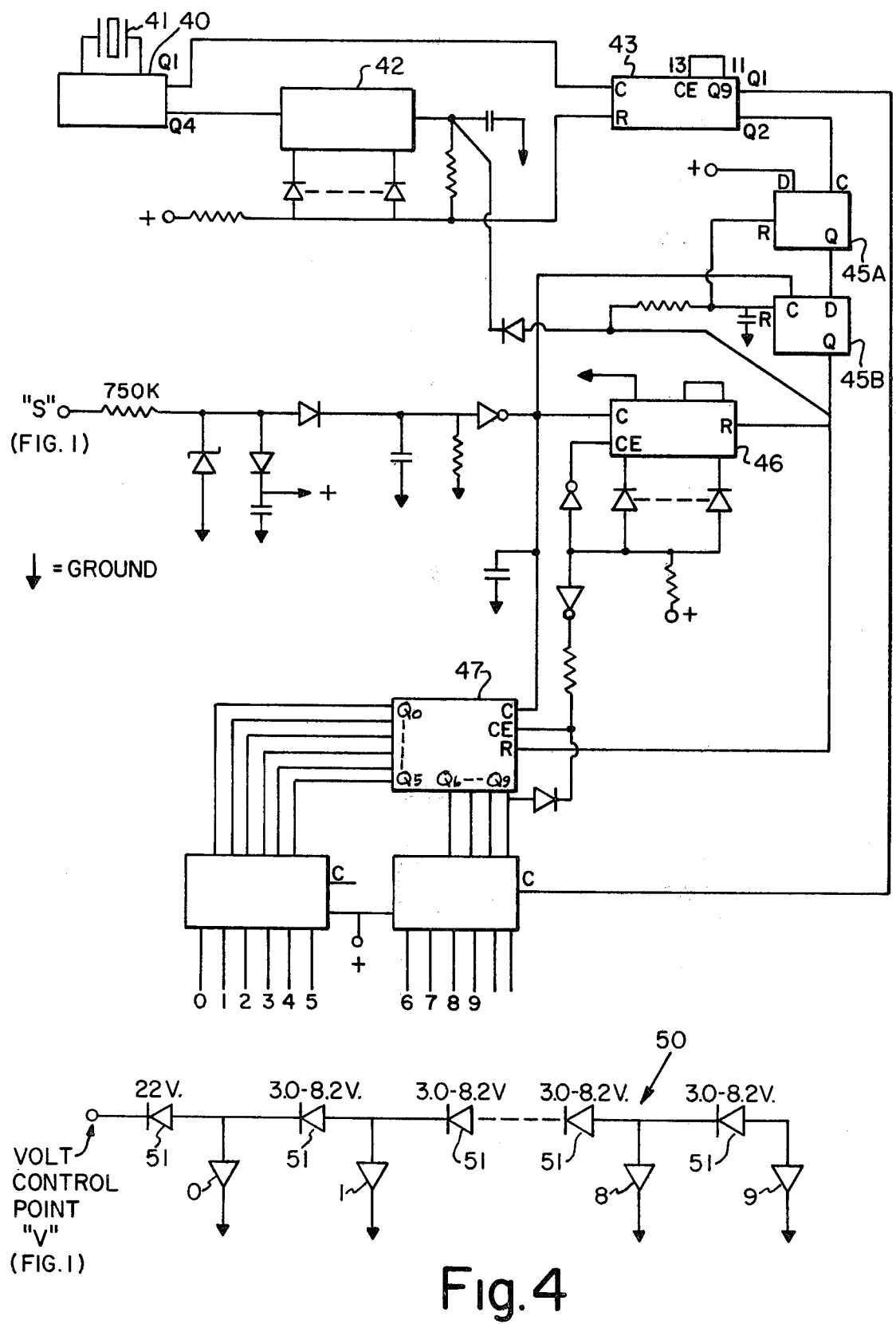
FIG. 4 is a schematic of a digital circuit for adjusting the voltage applied to the delay circuit of the ignition system according to this invention.

Referring now to FIG. 4, a time base generator 40 controlled by a crystal 41 outputs two clock signals; one at Q1 having a frequency of 32.768 kHz and another at Q4 having a frequency of 8.142 kHz. The lower frequency signal is applied to a ripple counter 42, the outputs of which are decoded to set the count or update period. The binary weighted outputs of the ripple counter are normally low thus pulling the anodes of the diode array low. Thus, the anode bus of the diode array remains low until each and every input attached to the diode array goes high. At that time, the anode bus of the diode array goes high. This signal is used to reset decade counter 43 which changes states at the clock frequency. The high on the anode bus of the diode array decoding the counter 42 is applied with a slight delay (see RC delay circuit) to insure adequate decode time to reset the counter 42.

The counter 43 outputs a first pulse Q1 used to latch output latches 44a and 44b. This signal (Q1) out of counter 43 ends the pulse counting period. The next pulse Q2 out of counter 43 is a raw reset pulse. It is combined in the circuit comprising dual D flip-flops with the next ignition pulse applied at P to generate a synchronized reset pulse at the output Q of 45b. The synchronized reset pulse is applied with a slight delay (see RC delay circuit) to reset the dual D flip-flops. It is also applied to a diode to reset the period counter 42 thus starting the count of a new time period synchronized with an ignition pulse (the counter resets itself and is reset again by the synchronized reset pulse). The synchronized reset pulse is used to reset three counters: counter 42, already described, and counters 46 and 47.

Counter 46 is a ripple counter for counting ignition pulses that has its binary weight output decoded by a diode array. The purpose of this counter is to gather the count corresponding to th speed at which timing advance is first varied, for example, at the lower end of the operating speed range. Thus if the operating load range of an internal combustion engine starts at 600 RPM the counter 46 would count pulses up to that number corresponding to about 600 RPM. When that pulse count corresponding to the minimum RPM of the operating range is reached, the anode bus of the diode decoder goes high due to the pull up resistor attached thereto. This signal is inverted and applied to the clock enable terminal of decade counter 47 enabling it to count up to 10 ignition pulses during the remainder of the update period. The decade counter outputs a high on one of the ten output lines corresponding to the count. The outputs of the counter 47 are applied to latches 44a and 44b which are clocked at the end of the update period to capture the count. At latching, one of the outputs goes high. This is converted to an analog signal in a zener diode voltage divider comprised of a plurality of series connected zener diodes 51. Between each zener is an analog switch (FET) for pulling that junction to ground. The zener voltages can be selected to provide a desired voltage at 'V' for the delay capacitor charging circuit depending upon the speed of the engine. In one embodiment of this invention that has been tested, the zener diodes in the series circuit had the values set forth in the following table.

| Engine RPM | Zener Value | Cumulative Zener Voltage | FET Switch |
|---|---|---|---|
| <620 | 22 | 22 | 0 |
| 620-650 | 2.4 | 24.4 | 1 |
| 651-681 | 2.4 | 26.8 | 2 |
| 682-712 | 3.3 | 30.1 | 3 |
| 713-743 | 8.2 | 38.3 | 4 |
| 744-774 | 8.2 | 46.5 | 5 |
| 775-805 | 5.6 | 52.1 | 6 |
| 806-836 | 5.6 | 57.7 | 7 |
| 837-867 | 3.3 | 61 | 8 |
| 868+ | 3.3 | 64.3 | 9 |

Q0 (47) is high while CE is high. When CE goes low, the counter proceeds through Q1→Q9. Therefore, up through 620 RPM (20 counts×31) the 22 volt zener is imposed. Thus by activating one of the 10 FET switches, the cumulative zener voltage as shown in the table could be obtained and applied to the delay capacitor charging circuit. These values were selected to provide an advance of approximately 16° over an operating range of 600 to 900 RPM in a circuit having three discharges per crankshaft revolution. The charging resistance was about 24 k ohms, the delay capacitor 15 microfarads, the discharge resistance about 2500 ohms and the threshold voltage of the delay SCR about 0.55 volts. The clock period was set to 0.6451613 seconds so that each ignition pulse counted was equivalent to 31 RPM. The counter 46 was set to accumulate 20 pulses (31×20=620 RPM) to establish the lower end of the operatiing range at which the advance in timing begins. The advances versus the RPM curve are set forth in FIG. 5. The continuous curve is the desired curve and the stepped curve is that actually achieved.

Figure 5:
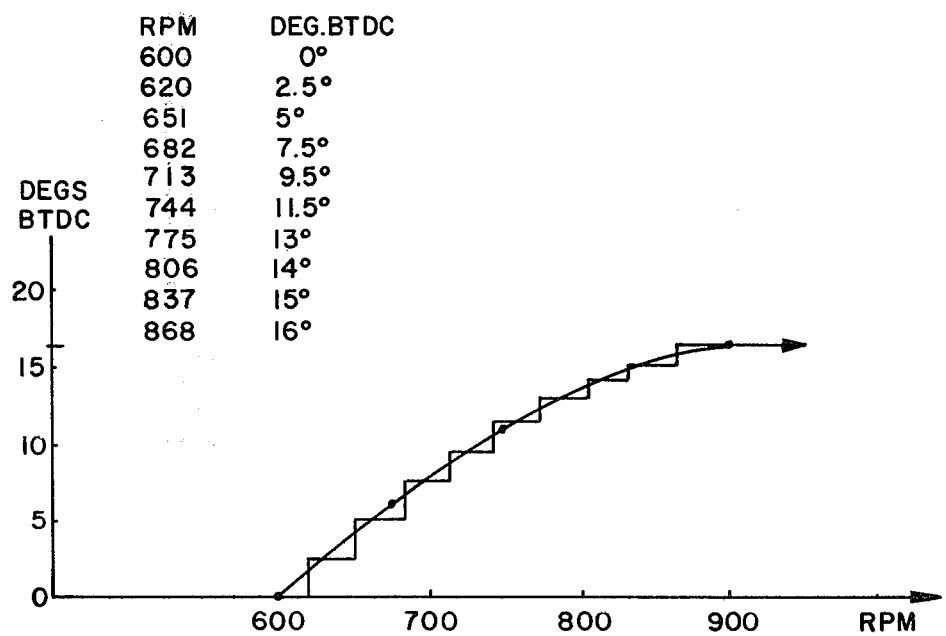
FIG. 5 is a graphical representation of timing advance achieved with an actual ignition system constructed according to the teachings of this invention.

As can be seen from FIG. 5, it is possible to obtain an advance of up 16° over the operating range with the apparatus according to this invention.

Having thus described the invention with the detail and particularity required by the Patent Laws, what is desired protected by Letters Patent is set forth in the following claims.

I claim:

1. A trigger circuit comprising:

first, second, and third triggerable switches each being rendered conductive when a signal at its control terminal reaches the threshold level;

said first switch being connected to accept a timing pulse signal;

said first and second switches being connected in series with each other and a control terminal of the third switch to activate the third switch when both the first and second switches have become conductive;

a delay circuit means in series with the first switch and in parallel with the gate and one other terminal of the second switch resulting in a time delay after the first switch is activated by the timing pulse signal before the second switch is activated thus triggering the third switch.

2. A triggering circuit according to claim 1 wherein the delay circuit comprises a delay capacitor in parallel with the gate and one other terminal of the second switch and a voltage source and resistance in series with the capacitor and first switch.

3. A trigger circuit according to claims 1 or 2 wherein the RC time constant of the circuit including the delay capacitor is selected to fix the time after the first switch is activated until the second and third switches are activated.

4. A triggering circuit according to claims 1 or 2 wherein a discharge resistor is connected in parallel with the delay capacitor to permit at least partial discharge thereof before the next time it is charged.

5. A trigger circuit according to claim 4 wherein the trigger circuit receives input timing piulse signals repetitively at near equal periods and the RC time constant of the capacitor and discharge resistor are about 1 to 0.1 times the period.

6. A trigger circuit according to claim 5 wherein the RC time constants are selected so that as the period is shortened the delay is proportionally shortened.

7. A triggering circuit according to claims 1 or 2 wherein the source voltage applied to the charging circuit of the delay capacitor is automatically varied to vary the delay.

8. In an ignition circuit for an internal combustion engine, a trigger circuit comprising:

first, second, and third triggerable switches each being rendered conductive when a signal at its control terminal reaches the threshold level;

said first switch being connected to accept a timing pulse signal generated in synchronism with the rotation of the engine;

said first and second switches being connected in series with each other and a control terminal of the third switch to activate the third switch when both the first and second switches have become conductive;

said third switch in a circuit to discharge a capacitor to a spark plug;

a delay circuit means in series with the first switch and in parallel with the gate and one other terminal of the second switch resulting in a time delay after the first switch is activated by the pulse signal before the second switch is activated thus triggering the third switch to discharge energy to a spark plug.

9. A triggering circuit according to claim 8 wherein the delay circuit comprises a delay capacitor in parallel with the gate and one other terminal of the second switch and a voltage source and resistance in series with the capacitor and first switch.

10. A trigger circuit according to claims 8 or 9 wherein the RC time constant of the circuit including the delay capacitor is selected to fix the time after the first switch is activated until the second and third switches are activated.

11. A triggering circuit according to claims 8 or 9 wherein a discharge resistor is connected in parallel with the delay capacitor to permit at least partial discharge thereof before the next time it is charged.

12. A trigger circuit according to claim 11 wherein the trigger circuit receives input timing pulse signals repetitively at near equal periods and the RC time constant of the capacitor and discharge resistor are about 1 to 0.1 times the period.

13. A trigger circuit according to claim 12 wherein the RC time constants are selected so that as the period is shortened the delay is proportionally shortened.

14. A triggering circuit according to claims 8 or 9 wherein the source voltage applied to the charging circuit of the delay capacitor is automatically varied to vary the delay with change in engine speed.

* * * * *